(12) United States Patent
Mitchell et al.

(10) Patent No.: US 9,458,734 B2
(45) Date of Patent: Oct. 4, 2016

(54) MODEL AND SIMULATION BASED CONTROL OF TURBINES

(75) Inventors: Paul Jeffrey Mitchell, Greenville, SC (US); Randy Scott Rosson, Simpsonville, SC (US); Kevin Wood Wilkes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1076 days.

(21) Appl. No.: 13/492,736

(22) Filed: Jun. 8, 2012

(65) Prior Publication Data

US 2013/0327053 A1 Dec. 12, 2013

(51) Int. Cl.
*G06G 7/48* (2006.01)
*F01D 19/00* (2006.01)
*F02C 9/00* (2006.01)

(52) U.S. Cl.
CPC .............. *F01D 19/00* (2013.01); *F02C 9/00* (2013.01); *Y02E 20/16* (2013.01); *Y02E 20/18* (2013.01)

(58) Field of Classification Search
CPC .......... F01D 19/00; F02C 9/00; Y02E 20/18; Y02E 20/16
USPC ........................................................ 703/6–7
See application file for complete search history.

(56) References Cited

U.S. PATENT DOCUMENTS

| 3,892,975 A | 7/1975 | Yannone et al. |
| 4,071,897 A | 1/1978 | Groves, Jr. et al. |
| 7,742,904 B2 | 6/2010 | Healy et al. |
| 7,801,711 B2 * | 9/2010 | Hayashi ................. F22B 35/18 700/288 |
| 7,853,392 B2 | 12/2010 | Healey et al. |
| 7,966,802 B2 | 6/2011 | Szepek et al. |
| 2007/0073525 A1 * | 3/2007 | Healy ..................... G05B 17/02 703/7 |
| 2008/0243352 A1 | 10/2008 | Healy |
| 2009/0241506 A1 | 10/2009 | Nilsson |
| 2011/0224959 A1 * | 9/2011 | Zhang .................... G05B 17/02 703/2 |
| 2011/0289932 A1 * | 12/2011 | Thompson ................ F02C 3/30 60/776 |
| 2013/0311139 A1 * | 11/2013 | Osmundsen ........... G05B 17/02 702/183 |

FOREIGN PATENT DOCUMENTS

| CN | 101230803 A | 7/2008 |
| CN | 101539056 A | 9/2009 |
| CN | 101699046 A | 4/2010 |

OTHER PUBLICATIONS

Unofficial English Translation of Chinese Office Action issued in connection with corresponding CN Application No. 201310224586.5 on Dec. 1, 2015.

* cited by examiner

*Primary Examiner* — Eunhee Kim
(74) *Attorney, Agent, or Firm* — Fletcher Yoder, P.C.

(57) ABSTRACT

A system includes a gas turbine system model configured to model a turbine system operational behavior of a gas turbine system, and a shaft contribution model (SCM) including a bottoming cycle performance (BCP) model configured to model a bottoming cycle behavior of a bottoming cycle system. The gas turbine system model is configured to receive a SCM output from the SCM and to use the SCM output to control an actuator. The actuator is operatively coupled to the gas turbine system.

20 Claims, 3 Drawing Sheets

MODEL AND SIMULATION BASED CONTROL OF TURBINES

BACKGROUND OF THE INVENTION

The subject matter disclosed herein relates to industrial control systems, and more specifically, to model and simulation based control systems for turbines.

Certain systems, such as an industrial control system, may provide for capabilities that enable the control and analysis of a turbine system. For example, the industrial control system may include controllers, field devices, and sensors storing data used in controlling the turbine system. Certain industrial control systems may use modeling and simulation systems for enhancing the industrial control system. It would be beneficial to improve the modeling and/or simulation systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine system model configured to model a turbine system operational behavior of a gas turbine system, and a shaft contribution model (SCM) including a bottoming cycle performance (BCP) model configured to model a bottoming cycle behavior of a bottoming cycle system. The gas turbine system model is configured to receive a SCM output from the SCM and to use the SCM output to control an actuator. The actuator is operatively coupled to the gas turbine system.

In a second embodiment, a method includes receiving a turbine operating parameter receiving a generator operating parameter, modeling at least one gas turbine operational boundary based on the turbine operating parameter and the generator operating parameter, and actuating a turbine system actuator based on the at least one gas turbine operational boundary.

In a third embodiment, a non-transitory tangible computer-readable medium having computer executable code stored thereon is provided. The code includes instructions for receiving a turbine operating parameter, receiving a generator operating parameter, modeling at least one gas turbine operational boundary based on the turbine operating parameter and the generator operating parameter, and actuating a turbine system actuator based on the at least one gas turbine operational boundary.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A Model Based Control (MBC) system included in a turbine control system may allow certain turbine systems, such as a gas turbine system coupled to an electrical generator, to monitor the actual operational parameters or operational behavior and generate real-time operational boundaries to adjust and tune control of the gas turbine system. However, MBC may not be readily compatible with single-shaft gas turbine systems or similar industrial systems, because key operational parameters used to tune a real-time gas turbine model of the power output contribution of the gas turbine system to the total generator power output may not be available in single drive shaft configurations. The model accuracy of estimated (e.g., non-measured) operational parameters used for MBC, such as the gas turbine system firing temperature, combustor exit temperature, and combustion temperature rise, may experience significant variability. Presently disclosed embodiments replace the measured contribution to generator power output of the gas turbine system with a real-time operational boundary model estimating all non-gas turbine system contributions to the drive shaft power output. By using a real-time estimation of contributions to shaft power output, the real-time operational boundary model may be generated with such accuracy that estimation variability in pertinent MBC control parameters may be substantially reduced or eliminated. As used herein, an "operational boundary" may refer to one or more control set points or controlled performance operating conditions to control and regulate a turbine system, a generator, a bottoming cycle system, or combinations thereof to operate at desired conditions, within desired operating parameters, or combinations thereof.

Figure 1:
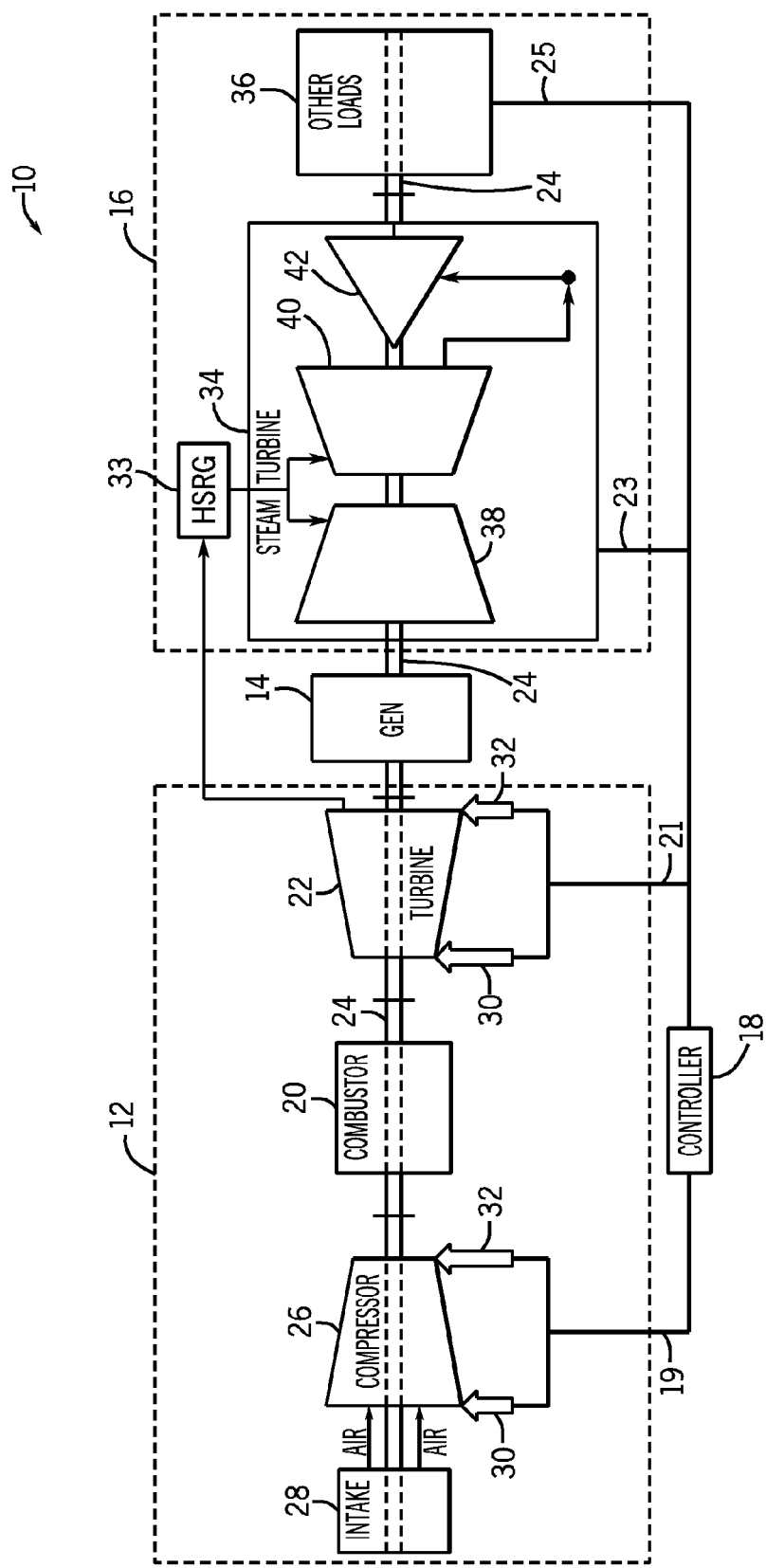
FIG. 1 is a bock diagram of an embodiment of an industrial control system suitable for model and simulation based control, including a controller.

With the foregoing in mind, it may be useful to describe an embodiment of a power generation system incorporating techniques disclosed herein, such as an industrial power generation system 10 (e.g., combined cycle power generation system) illustrated in FIG. 1. As depicted, the system 10 may include a gas turbine system 12, a generator 14, a bottoming cycle system 16, and a controller 18. The gas turbine system 12 may further include a combustor 20, a turbine 22, a compressor 26, and an intake 28. The combustor 20 may receive fuel that may be mixed with air, for combustion in a chamber within the combustor 20. This combustion 20 may create hot pressurized exhaust gases. The combustor 20 may then direct the exhaust gases through the turbine 22 toward one or more exhaust outlets. Thus, the turbine 22 may be part of a rotor. As the exhaust gases pass through the turbine 22, the gases may force turbine blades to rotate a drive shaft 24 along an axis of the gas turbine system 12. As will be discussed in further detail, the drive shaft 24 may be coupled to various components of the system 10, including not only components of the gas turbine system 12, but also the generator 14 and components of the bottoming cycle system 16. In certain embodiments, operational characteristics (e.g., pressure, temperature, flow rate, etc.) may be sensed or estimated from the drive shaft 24 to generate a gas turbine system 12 control model, as described in more detail with respect to FIG. 2 below.

The drive shaft 24 may include one or more shafts that may be, for example, concentrically aligned. The drive shaft 24 may include a shaft connecting the turbine 22 to the compressor 26 to form a rotor. Similarly, the compressor 26 may include blades coupled to the drive shaft 24. Thus, rotation of turbine blades in the turbine 22 causes the shaft connecting the turbine 22 to the compressor 26 to rotate blades within the compressor 20. Such a mechanism may compress air in the compressor 20. The rotation of blades in the compressor 26 may compress air that may be received via the air intake 28. The compressed air may be fed to the combustor 20 and mixed with fuel, for example, to allow for higher efficiency combustion. In certain embodiments, the gas turbine system 12 may also generate mechanical power to drive the generator 14 to produce electrical power.

The gas turbine system 12 may further include a number of sensors and field devices configured to monitor a plurality of physical and operational parameters related to the operation and performance of the power generation system 10. The sensors and field devices may include, for example, inlet sensors and field devices 30 and outlet sensors and field devices 32 (e.g., pressure transmitters, temperature transmitters, flow transmitters, fuel sensors, clearance sensors [e.g., measuring distances between rotating and stationary components]) positioned adjacent to, for example, the inlet and outlet portions of the turbine 22 and the compressor 20, respectively. Although not illustrated, it should also be appreciated that the generator 14 and bottoming cycle system 16 may also include a number of sensors and field devices 30 and 32. The inlet sensors and field devices 30 and outlet sensors and field devices 32 may measure environmental conditions. For example, the inlet sensors and field devices 30 and outlet sensors and field devices 32 may measure the ambient temperature, ambient pressure, humidity, and air quality (e.g., particulate in air). The inlet sensors and field devices 30 and outlet sensors and field devices 32 may also engine parameters related to the operation and performance of the gas turbine system 12, such as, exhaust gas temperature, rotor speed, engine temperature, engine pressure, fuel temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 30 and 32 may also measure actuator information such as valve position, switch position, throttle position, and a geometry position of variable geometry components (e.g., air inlet).

The number of sensors and field devices 30 and 32 may also be configured to monitor physical and operational parameters related to various operational phases of the gas turbine system 12, the generator 14, and the bottoming cycle system 16. Measurements taken by the number of sensors and field devices 30 and 32 may be transmitted via data bus lines 19, 21, 23, 25, which may be communicatively coupled to a controller 18. As will be discussed in greater detail, the controller 18 may use the measurements to calculate and generate models to actively control one or more of the gas turbine system 12, the generator 14, and the bottoming cycle system 16.

Further, the sensors and field devices 30 and 32 may sense and transmit the measurements to the controller 18. For example, data bus line 19 may be utilized to transmit measurements from the compressor 26, while data bus line 21 may be utilized to transmit measurements from the turbine 22. It is to be understood that other sensors may be used, including combustor 20 sensors, intake 28 sensors, exhaust and load sensors. Likewise, any type of field devices may be used, including "smart" field devices such as Fieldbus Foundation, Profibus, or Hart and/or Wireless Hart field devices.

As previously noted, in certain embodiments, the system 10 may also include the bottoming cycle system 16. The bottoming cycle system 16 may be mechanically coupled via the drive shaft 24 to the generator 14 and the gas turbine system 12 and communicatively coupled via the controller 18 to the generator 14 and the gas turbine system 12. The bottoming cycle system 16 may also contribute to the power (e.g., electrical power) output of the generator 14. Thus, the bottoming cycle system 16 may be any system configured to convert heat energy (e.g., exhaust energy of gas turbine system 12) that may be otherwise wasted into additional power that may be used, for example, to drive the generator 14. For example, the bottoming cycle system 16 may be a Rankine cycle, a Brayton cycle, or other similar steam-driven power (e.g., mechanical and electrical) generating system.

In certain embodiments, the bottoming cycle system 16 may include a heat recovery steam generator (HRSG) 33, a steam turbine system 34, and other loads system 36. The heat recovery steam generator (HRSG) 33 may receive, for example, heated exhaust gas from the gas turbine system 12. The HSRG 33 may use the heated exhaust gas to heat, for example, water and produce steam used to power the steam turbine system 34. The steam turbine system 34 may be a combination of a high pressure (HP) (e.g., approximately 2000-2400 psi) turbine 38, an intermediate pressure (IP) (e.g., approximately 300-345 psi) turbine 40, and a low pressure (LP) (e.g., approximately 30-35 psi) turbine 42, which may each be utilized in tandem to drive the generator 14 via the single drive shaft 24.

Similarly, the other loads 36 may include various mechanical loads, which may contribute to the power output of the drive shaft 24, and by extension the power output of the generator 14. For example, the mechanical loads may include various fixed and rotating equipment such as additional turbines, generators, load compressors, and so forth that may each be used to generate or facilitate the generation of power (e.g., mechanical or electrical energy). In certain embodiments, power outputs of the components (e.g., steam turbine system 34, other loads 36) of the bottoming cycle system 16 may be used to generate a shaft contribution model (SCM) to estimate the contribution of the bottoming cycle system 16 to the power output of the single drive shaft 24.

As noted above, the system 10 may include the controller 18. The controller 18 may suitable for generating and implementing a variety of control models and simulations to estimate the output power of the single drive shaft 24. The controller 18 may also provide an operator interface through which an engineer or technician may monitor the components of the power generation system 10 such as, components of the gas turbine system 12 and the bottoming cycle system 16. Accordingly, the controller 18 may include a processor that may be used in processing readable and executable computer instructions, and a memory that may be used to store the readable and executable computer instructions and other data. These instructions may be encoded in programs stored in tangible non-transitory computer-readable medium such as the controller's 18 memory or other storage. In certain embodiments, the controller 18 may host various industrial control software, such as a human-machine interface (HMI) software, a manufacturing execution system (MES), a distributed control system (DCS), and/or a supervisor control and data acquisition (SCADA) system. The controller 18 may further support one or more industrial communications (e.g., wired or wireless) protocols such as, Foundation Fieldbus or Hart and/or Wireless Hart. For example, the controller 18 may support GE Energy GE ControlST, which may assign and distribute configuration tools and similar control data to various field equipment and devices.

As such, the controller 18 may be communicatively coupled to a plant data bus and bus lines 19, 21, 23 and 25, which may allow for communication between the controller 18 and the inlet and outlet sensors and field devices 30 and 32, gas turbine system 12, and the bottoming cycle system 16. Indeed, the controller 18 may support one or more operating systems capable of running and supporting various software applications and systems, as well as managing the various hardware (e.g., processors, storages, gateways, programmable logic controllers [PLCs], and so forth) that may be included as part of the controller 18. For example, in certain embodiments, the controller 18 may support one or more real-time model-based control systems and algorithms, such as a gas turbine system model 50 and a shaft contribution model (SCM) 52.

Figure 2:
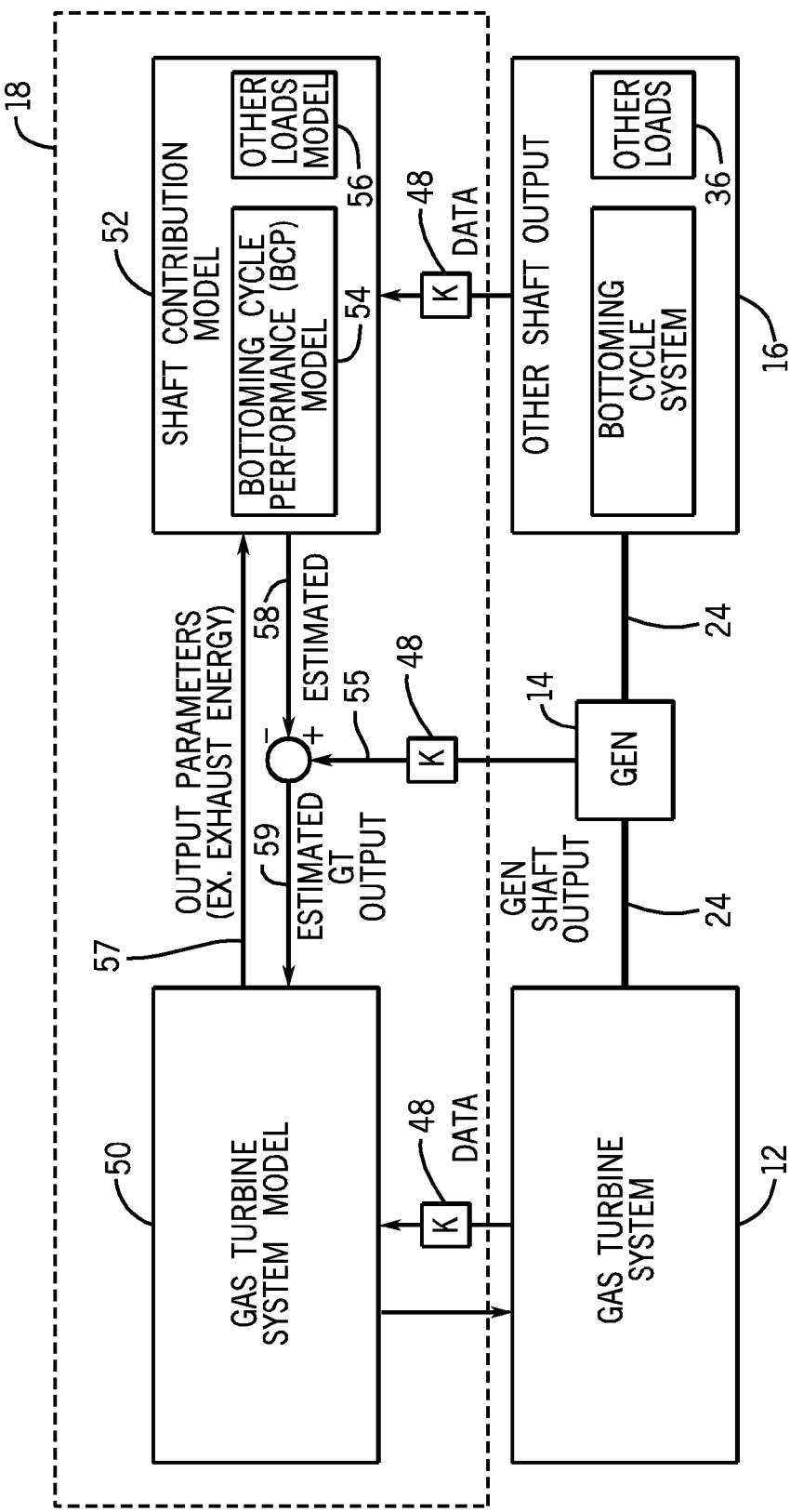
FIG. 2 is a block diagram of an embodiment of a model and simulation based control system including the system of FIG. 1.

Accordingly, FIG. 2 depicts the controller 18 of the system 10 of FIG. 1, including the previously discussed control models (e.g., gas turbine model 50, SCM 52). As noted above with respect to FIG. 1, the gas turbine system 12 may couple mechanically to the generator 14 via the single drive shaft 24. Likewise, the bottoming cycle system 16 may also couple mechanically to the generator 14 via the single drive shaft 24. Thus, the gas turbine system 12 and the bottoming cycle system 16 may collectively contribute to the total output power 55 of the generator 14. Advantageously, the gas turbine system model 50 and shaft contribution model (SCM) 52 may be generated based on the sensed and estimated operating parameters received via Kalman filters 48, or other estimation techniques (e.g., linear quadratic estimation, Riccati estimation) to actively control the power generation system 10.

In certain embodiments, the controller 18 may receive and analyze sensed and estimated power outputs of the gas turbine system 12 and the bottoming cycle system 16 processed via one or more Kalman filters 48. It should be appreciated that the Kalman filters 48 may be implemented as hardware, software, or combinations thereof. The Kalman filters 48 may each include a set of mathematical equations and computations to efficiently and accurately estimate the state of the electrical power generation process by implementing one or more recursive functions. For example, the Kalman filters 48 may each receive (as inputs) signals indicating the differences between measured gas turbine system 12 operational parameters or operational behavior from various sensors (e.g., sensors and field devices 30 and 32) and the estimated operational parameters output from one or more models (e.g., gas turbine system model 50, SCM 52).

The Kalman filters 48 may also each include a Kalman filter gain matrix (KFGM), which may be an array of numbers representing the uncertainty weighted sensitivity of models of estimated parameters to changes in model performance multipliers. The Kalman filters 48 may each use the supplied inputs to generate performance multipliers that are applied to tune the models (e.g., gas turbine model 50, SCM 52), and increase the accuracy of the estimated gas turbine 12 operational parameters. The Kalman filter gain matrix (KFGM) of the Kalman filters 48 may be calculated by a squared array (e.g., 3×3, 4×4, 6×6) or a non-squared array (e.g., 4×6 or 6×4) of mathematical equations. The mathematical equations may further include (as inputs) a model sensitivity matrix (MSM) and estimates of the model and measurement uncertainty. The MSM of Kalman filters 48 may be calculated on-line in real-time by perturbation and evaluation of the gas turbine system model 50. The Kalman filters 48 may optimize the multiplier values to minimize the differences between the estimated and measured operating parameters. For example, the gas turbine system model 50 may be adaptive to changing efficiencies, fuels, flow capacities, and other parameters of the actual gas turbine system 12. The output performance multipliers generated by the Kalman filter adapt the gas turbine system model 50 to better match the measured parameters of the gas turbine system 12. Nevertheless, it should be understood that the Kalman filters 48 may not rely solely on sensor measurements, but may use accurate estimated models generated by the SCM 52 to perform real-time tuning of the gas turbine system 12.

Further, the MSM and KFGM of Kalman filters 48 may be calculated in real-time, which may allow the Kalman filters 48 to adapt to changes in the number of available sensors and type of measured output parameters 57 available to compare to the estimated output parameters 59 of the model (e.g., SCM 52). In the case that one or more operational parameters of the gas turbine system 12 and/or bottoming cycle system 16 may no longer be measured due to, for example, a sensor failure, the Kalman filters 48 may be modified to account for the loss of the measured operational parameters, and may continue to generate performance multipliers based on the modeled operational boundaries of the gas turbine system 12 and/or bottoming cycle system 16. Still, in the case the model (e.g., SCM 52) may become inaccurate or inexact, the Kalman filters 48 may be adjusted within the control system or reconfigured in real-time to adjust the model (e.g., SCM 52) to reflect adjustments in operational parameters or operational behavior of the gas turbine system 12.

As previously discussed, the controller 18 may use and/or generate a gas turbine system model 50 and shaft contribution model (SCM) 52 to estimate the contributions of the gas turbine system 12 and bottoming cycle system 16 to the total power output 55 of the single drive shaft 24. In certain embodiments, the gas turbine system model 50 may include Adaptive Real-time Engine Simulation (ARES) and model-based control (MBC). For example, the gas turbine system model 50 (e.g., ARES and MBC) may, in real-time, model one or more operating parameters (e.g., compressor 26 discharge temperature, pressure, flow rate, and so forth) of the gas turbine system 12. The gas turbine system model 50 may receive inputs of real-time operating parameters of gas turbine system 12 via the one or more Kalman filters 48. The real-time inputs of operating parameters received by the gas turbine system model 50 may include, for example, turbine 22 and compressor 26 discharge pressure, temperature, exhaust energy (e.g., combination of airflow, temperature, and fuel composition), and power output of the gas turbine system 12. The real-time inputs of operating parameters received by the gas turbine system model 50 may then be output (e.g., output parameters 57) to the shaft contribution model (SCM) 52, which may include a bottoming cycle performance (BCP) model 54 (e.g., based on the operational parameters or operational behavior of the bottoming cycle system 16) and other loads model 56 (e.g., based on the operational parameters or operational behavior of the other loads system 36). The SCM 52 may then generate model operational boundaries for the gas turbine system 12. Specifically, the SCM 52 may generate an estimation of the gas turbine system 12 power output 59 contribution based on the real-time operating parameters received from the gas turbine system model 50.

Similarly, in addition to the real-time operating parameters received from the gas turbine system model 50, the SCM 52 may also receive inputs of real-time bottoming cycle system 16 operating parameters via one or more Kalman filters 48. Again, real-time inputs of operating parameters received by the SCM 52 may include, for example, the pressures, temperatures, flow rates, exhaust, and so forth of the steam turbine system 34, other loads system 36, and similar industrial machinery that may included in the bottoming cycle system 16. The SCM 52 may also receive further operational parameters (e.g., speed, torque, and so forth) of the single drive shaft 24, and by extension the generator 14. Thus, the summation of the real-time operational parameters received from the gas turbine system model 50, bottoming cycle system 16, and generator 14 may represent the total power output 55 of the single drive shaft 24. Accordingly, the SCM 52 may generate models estimated or inferred by calculating the difference between the generator 14 output (i.e., total power output 55 of the single drive shaft 24 including the power output contributions of the gas turbine system 12 and the bottoming cycle system 16) and the SCM 52 models or estimated outputs 58 based on the operational parameters received from both the gas turbine system model 50 and the bottoming cycle performance (BCP) model 54 and other loads model 56. That is, the power output 58 (e.g., power output of the BCP model 54 and other loads model 56) estimated by the SCM 52 may be subtracted from the generator 14 power output (e.g., total power output 55 of the drive shaft 24) to yield an estimated or inferred gas turbine system 12 power output 59. The estimated gas turbine system 12 power output 59 may then be input to the gas turbine system model 50. The gas turbine system model 50 may then controllably tune the gas turbine system 12 continuously in real-time via one or more Kalman filters 48 by generating an actuator output to control, for example, the speed and torque of the drive shaft 24. Specifically, the gas turbine system model 50 may tune the gas turbine system 12 by comparing the received estimated gas turbine system 12 power output 59 to the pertinent operational parameters (e.g., compressor 26 discharge pressure, discharge temperature, exhaust temperature, and the generator 14 output including only the contribution of the gas turbine system 12) sensed from the gas turbine system 12.

As it may be worth noting, without the presently disclosed embodiments, implementations of the gas turbine system model 50 (e.g., ARES and MBC) may have used one or more Kalman filters 48 that relied almost exclusively upon measurements of compressor 22 discharge pressure, temperature, exhaust temperature, and generator 14 output including only the contribution of the gas turbine system 12 to perform the real-time data reduction and control of the gas turbine system 12. Presently disclosed embodiments may remove reliance upon the measurement of the generator 14 power output 55, and may replace the measurement with the real-time estimated gas turbine system 12 power output 59, which, as noted above, may be calculated as the difference between the generator 14 total power output 55 and the SCM 52 estimated power output 58 of additional contributions to the generator 14 total power output 55. This, again, may provide an estimated and modeled value of gas turbine system 12 power output 59, which may be input to the gas turbine system model 50 and used to generate one or more actuator outputs or control signals for active and real-time control of the gas turbine system 12.

Figure 3:
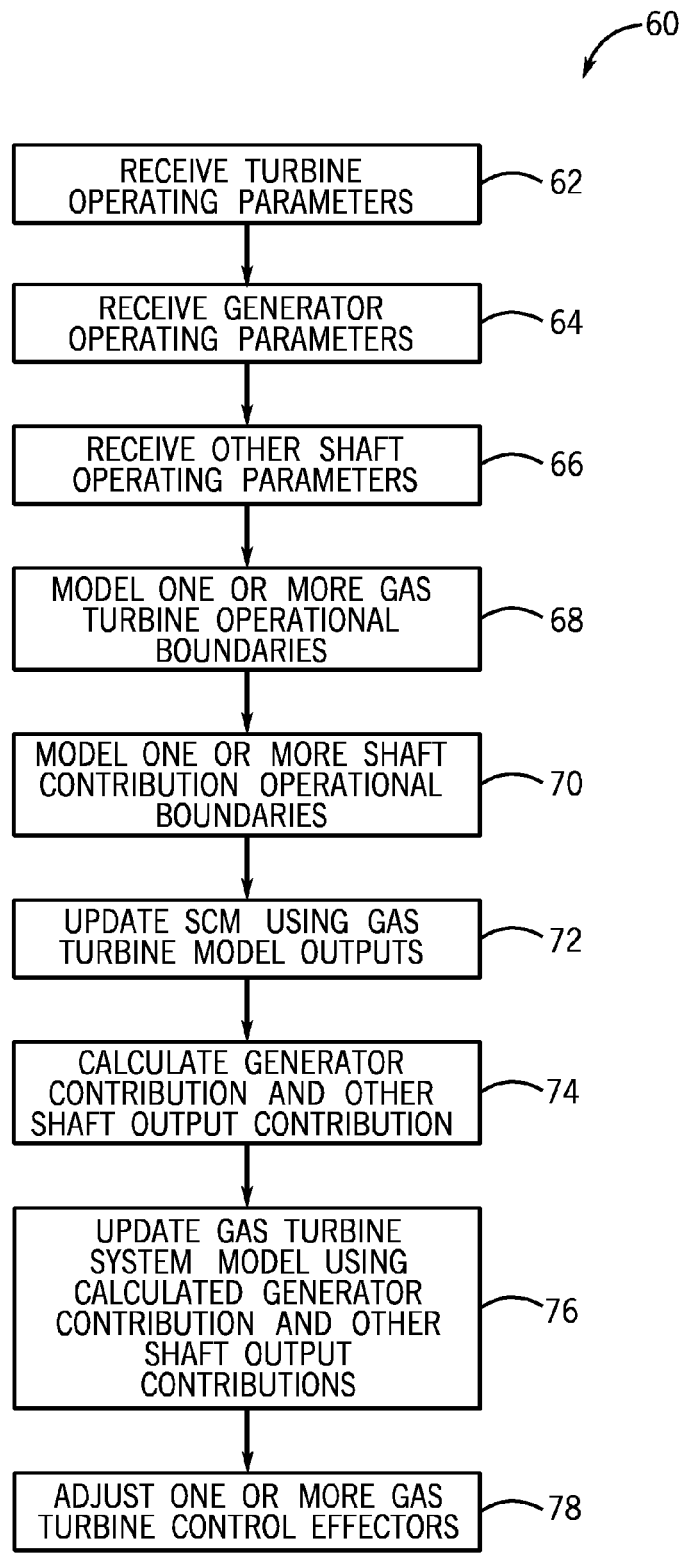
FIG. 3 is a flow chart of an embodiment of a process suitable for implementing the model and simulation based control of the system of FIG. 1.

Turning now to FIG. 3, a flow diagram is presented, illustrating an embodiment of a process 60 useful in generating the gas turbine system model 50 and shaft contribution model (SCM) 52, by using, for example, the controller 18 included in the power generation system 10 depicted in FIG. 2. The process 60 may include code or instructions stored in a non-transitory machine-readable medium (e.g., a memory) and executed, for example, by one or more processors included in the controller 18. The process 60 may begin with the controller 18 receiving (block 62) the gas turbine system 12 operating parameters. As previously discussed, gas turbine system model 50 of controller 18 may received sensed operating parameters of the gas turbine system 12 via the one or more Kalman filters. Similarly, the controller 18 may receive (block 64) the operational parameters (e.g., speed, torque, and so forth) of the generator 14. Still similar, the controller 18 may receive (block 66) the other shaft (e.g., bottoming cycle system 16) operating parameters. The process 60 may then continue with the modeling of the received operational parameters. For example, the controller 18 may model (block 68) one or more gas turbine system 12 operational boundaries, as well as model (block 70) one or more shaft contribution (e.g., SCM 52) operational boundaries. The SCM 52 of controller 18 may then be updated (block 70) using the gas turbine system 12 outputs. For example, the SCM 52 may receive the operating parameters 57 of the gas turbine system 12 from the gas turbine system model 50. The SCM 52 may then utilize the received gas turbine system 12 operating output parameters 57 to estimate the contribution of the gas turbine system 12 to the total power output 55 of the drive shaft 24. The estimated gas turbine system 12 output 59 may then be output to the gas turbine system model 50, in which the gas turbine system model 50 may be updated (block 76) using the estimated or calculated generator 14 contribution and other shaft output contributions. The gas turbine system 12 control effectors may then be adjusted (block 78) based on the updated gas turbine system model 50. For example, one or more actuator control signals may be generated by the gas turbine system model 50 to control, for example, the speed and torque of the drive shaft 24, and by extension control the gas turbine system 12.

Technical effects of the disclosed embodiments include the generation of a real-time gas turbine system model and a shaft contribution model (SCM), which may include a bottoming cycle performance (BCP) model and other loads model. The measured contribution of a gas turbine system to the total power output of a generator is replaced with an estimated gas turbine system contribution to the total power output. Accordingly, the estimated contribution of the gas turbine system to the total power output of the generator may be calculated as the difference between the total power output of the generator and the power output from the real-time shaft power contribution model (SCM). The SCM may include real-time operational parameters received from the gas turbine system model along with real-time operational parameters of a bottoming cycle system to generate estimates of additional contributions to the total power output of the generator apart from the contribution of the gas turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine system model configured to model a turbine system operational behavior of a gas turbine system; and
   a shaft contribution model (SCM) comprising a bottoming cycle performance (BCP) model configured to model a bottoming cycle behavior of a bottoming cycle system, wherein the gas turbine system model is configured to receive a SCM output from the SCM and to use the SCM output to control an actuator, wherein the bottoming cycle system comprises a heat recovery steam generator (HSRG), a steam turbine system, and additional mechanical loads, and wherein the actuator is operatively coupled to the gas turbine system.

2. The system of claim 1, wherein the gas turbine system model is configured to receive a sensor output from a generator sensor disposed in an electric generator and to use the sensor output to derive the actuator output.

3. The system of claim 2, wherein the gas turbine system model is configured to combine the SCM output and the sensor output to derive an estimated gas turbine system power output, and to use the estimated gas turbine system power output to derive the actuator output.

4. The system of claim 1, wherein the BCP model is configured to receive a gas turbine system model output to tune the BCP model of the bottoming cycle behavior of the bottoming cycle system.

5. The system of claim 1, wherein the gas turbine system model is configured to apply a Kalman filter to a sensor data received from the gas turbine system to tune the gas turbine system model of the turbine system operational behavior.

6. The system of claim 1, wherein the BCP model is configured to apply a Kalman filter to a sensor data received from the bottoming cycle system to tune the BCP model of the bottoming cycle behavior.

7. The system of claim 1, wherein the SCM comprises a load model configured to model a load behavior of a load, and wherein the load is configured to mechanically couple to the gas turbine system.

8. The system of claim 1, wherein the SCM output comprises an estimated shaft load.

9. The system of claim 1, comprising a controller having the gas turbine system model and the bottoming cycle performance model, and wherein the controller is configured to use the actuator output to actuate an actuator, and wherein the actuator is configured to control a flow of a fuel into the gas turbine system.

10. The system of claim 1, comprising an integrated gasification combined cycle (IGCC) plant having the gas turbine system.

11. A method, comprising:
    receiving a turbine operating parameter;
    receiving a generator operating parameter;
    modeling at least one gas turbine operational boundary based on the turbine operating parameter and the generator operating parameter;
    applying a shaft contribution model (SCM) comprising a bottoming cycle performance (BCP) model configured to model a bottoming cycle behavior of a bottoming cycle system, wherein the modeling comprises receiving a SCM output from the SCM and to use the SCM output to control an actuator, wherein the bottoming cycle system comprises a heat recovery steam generator (HSRG), a steam turbine system, and additional mechanical loads, and wherein the actuator is operatively coupled to a turbine system; and
    actuating the actuator based on the at least one gas turbine operational boundary.

12. The method of claim 11, comprising receiving another shaft output parameter and modeling the at least one gas turbine operational boundary based on the turbine operating parameter, the generator operating parameter, and the other shaft output parameter.

13. The method of claim 12, wherein the other shaft output parameter comprises a bottoming cycle system parameter, another load parameter, or a combination thereof.

14. The method of claim 11, wherein the receiving the generator operating parameter comprises using a generator sensor to receive a generator sensor output.

15. The method of claim 11, wherein the modeling the at least one gas turbine operational boundary comprises applying a Kalman filter to the turbine system operating parameter, to the generator operating parameter, or to the combination thereof.

16. A non-transitory computer-readable medium having computer executable code stored thereon, the code comprising instructions for:
    receiving a turbine operating parameter;
    receiving a generator operating parameter;
    modeling at least one gas turbine operational boundary based on the turbine operating parameter and the generator operating parameter;
    applying a shaft contribution model (SCM) comprising a bottoming cycle performance (BCP) model configured to model a bottoming cycle behavior of a bottoming cycle system, wherein the modeling comprises receiving a SCM output from the SCM and using the SCM output to control a turbine system actuator, wherein the bottoming cycle system comprises a heat recovery steam generator (HSRG), a steam turbine system, and additional mechanical loads; and actuating the turbine system actuator based on the at least one gas turbine operational boundary.

17. The non-transitory computer-readable medium of claim 16, wherein the code comprises instructions for:
receiving a shaft output parameter and modeling the at least one gas turbine operational boundary based on the turbine operating parameter, the generator operating parameter, and the shaft output parameter.

18. The non-transitory computer-readable medium of claim 16, wherein the code comprises instructions for:
applying a Kalman filter to a sensor data received from a gas turbine system to tune a model of a gas turbine system operational behavior.

19. The non-transitory computer-readable medium of claim 16, wherein the instructions for receiving the generator operating parameter comprises instructions for using a generator sensor to receive the generator operating parameter, wherein the generator sensor is disposed in an electric generator.

20. The non-transitory computer-readable medium of claim 16, wherein the instructions for modeling the at least one gas turbine operational boundary comprise instructions for applying a Kalman filter to the turbine system operating parameter, to the generator operating parameter, or to the combination thereof.

* * * * *